United States Patent Office 3,579,556
Patented May 18, 1971

3,579,556
NICKEL KETOXIME CHELATES
Peter James Briggs and Ronald James Hurlock, Manchester, England, assignors to Imperial Chemical Industries Limited, London, England
No Drawing. Filed June 21, 1968, Ser. No. 738,839
Claims priority, application Great Britain, June 26, 1967, 29,427/67
Int. Cl. C07j 15/04; C08j 45/62
U.S. Cl. 260—439R
4 Claims

ABSTRACT OF THE DISCLOSURE

Nickel chelate complexes of syn-alkyl 2-hydroxyaryl ketoximes in which the alkyl group contains at least 6 carbon atoms are used as light stabilisers for polymers, especially polyolefins. The chelate complexes are prepared from the syn-alkyl 2-hydroxyaryl ketoximes by reacting with a solution of a nickel salt.

---

The invention relates to stabilisers for polymers and more particularly to certain metal complexes derived from aromatic oximes containing phenolic groups useful for the stabilisation of polymers.

Our copending application No. 586,947, now Pat. No. 3,459,703 discloses that polymers may be stabilised against degradation by light by complexes from certain metals and certain aromatic oximes containing phenolic hydroxyl groups wherein a chelate ring is formed containing the oxygen atom of the phenolic hydroxyl group, the nitrogen atom of the oxime group and the metal. It has now been found that nickel chelates of this general type wherein the oximes are derived from o-hydroxyaryl alkyl ketones in which the alkyl group contains at least 6 carbon atoms are particularly effective as stabilisers.

According to the invention there are provided chelate complexes of nickel with an aromatic oxime of the formula

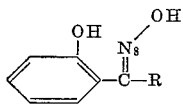

wherein R represents an optionally substituted alkyl or alkenyl group containing at least 6 carbon atoms and the benzene ring may optionally be further substituted.

According to a further feature of the invention there is provided a process for the stabilisation of polymers against light which comprises incorporating into the polymer a chelate complex of nickel as hereinbefore defined.

As polymers which may be stabilised in this way there may be mentioned for example particularly polyolefines such as polyethylene, polypropylene especially, and poly-4-methylpent-1-ene, but also polymers such as polyvinyl chloride, polyformaldehyde, and condensation products such as polyamides, for example, polyhexamethyleneadipamide.

The chelate complex may be incorporated into the polymer in any conventional manner, for example by dissolving the chelate complex in a low-boiling solvent and, after thoroughly mixing the solution with the polymer in powder form, evaporating the solvent; or by means of mechanical mixing; or by extrusion compounding.

The chelate complex should be present in the polymer in amount from 0.01 to 5%, and preferably from 0.2 to 1%, by weight of the polymer.

The chelate complex may be used alone or may be used in conjunction with other conventional additives to the polymers, for example antioxidants such as phenolic compounds, metal salts or esters of thiodipropionic acid, dialkyl sulphides, salts or esters of dialkyldithiocarbamates, dialkyldithiophosphoric acid or salts or esters thereof, alkyl or aryl phosphites or thiophosphites, salts or esters of phosphorus oxy- or thioacids, or esters of boric acid, ultra-violet light absorbers, soaps, plasticisers, antistatic agents, pigments, dyes and fillers.

The chelate complexes of the invention produce a considerable increase in the resistance of the polymer to degradation by light and are superior to nickel ketoximes derived from purely aromatic ketones or aryl alkyl ketones in which the alkyl group contains less than 6 carbon atoms since they cause little or no discoloration of the polymers and have a reduced tendency to bloom from the polymer. In many cases the stability so provided is not significantly reduced by treatments such as washing of the stabilised polymer.

As optionally substituted alkyl or alkenyl groups which may be represented by R there may be mentioned for example heptyl, undecyl, heptadecyl, hexadecyl, nonyl, 2-ethylhexyl, decyl, pentadecyl and octadec-9-enyl.

The benzene ring may be part of a polynuclear fused ring system as in the α- or β-naphthyl group or may optionally carry other substituents such as a hydrocarbon group for example an alkyl group such as methyl, isopropyl or tert.-butyl, nonyl, lauryl or tert.-octyl, α-methylcyclohexyl or phenyl, a halogen atom such as chlorine, an alkoxy group such as methoxy or octyloxy, or a nitro group. The preferred substituents are a 4-methyl group or a 5-chloro atom.

The phenolic hydroxyl group and the oxime group must be positioned so that chelation is possible, the metal atom replacing the hydrogen atom of the phenolic hydroxyl group and being chelated with the nitrogen atom of the oxime group, so therefore the oxime must be in the syn-configuration with respect to R.

In these chelate complexes of the invention one molecular proportion of the nickel ion is associated with two molecular proportions of the oxime.

Examples of the chelate complexes of the invention are nickel bis(syn-undecyl 2-hydroxy-4-methylphenyl ketoxime), nickel bis(syn-heptadecyl 2-hydroxyl-4-methylphenyl ketoxime), nickel bis(syn-heptadecyl 1-hydroxylnaphthyl ketoxime), and nickel bis(syn-heptadecyl 2-hydroxy-5-chloropheny ketoxime).

The chelate complexes may be prepared by any conventional means employed in the manufacture of chelate complexes in general. For example a solution of a nickel salt is reacted with two molecular proportions of the aromatic oxime. The reaction is preferably carried out in a solvent such as ethanol or water, the reaction mixture being heated if necessary. The chelate complex is then isolated in conventional manner, for example by filtration in the usual case where it is insoluble in the solvent or by precipitation with dilute ammonia solution followed by filtration.

Suitable nickel salts to be used in preparation of the chelate complex are the acetate, chloride, sulphate or nitrate.

The invention is illustrated but not limited by the following examples in which all parts and percentages are by weight.

EXAMPLE 1

Polypropylene is blended with 0.1% of 1,1,3-tris(2-methyl-4-hydroxy-5-t-butylphenyl)butane, 0.5% of trilauryltrithiophosphite, 0.4% of calcium stearate and 0.5% of stabiliser, and spun at 225° C. and draw ratio 4:1. The resulting yarns are then exposed to a 6000 watt Xenon Arc Lamp for 600 hours and the average toughness of the yarns defined as tenacity (gm./den.) X percent extension at break$\times 2 \times 10^{-2}$, is determined before and after exposure.

Table I

| Stabiliser: | Percent toughness retained after 600 hours exposure to Xenon arc |
|---|---|
| None | 3 |
| Nickel bis(syn - heptadecyl-2-hydroxy-4-methylphenyl ketoxime) | 20 |
| Nickel bis(syn - heptadecyl-2-hydroxy-5-chlorophenyl ketoxime) | 19 |

EXAMPLE 2

Polypropylene is blended with 0.1% of 1,1,3-tris(2-methyl - 4 - hydroxy-5-t-butylphenyl)butane, 0.5% of dilauryl thiodipropionate, 0.4% of calcium stearate and 0.5% of stabiliser, and spun at 225° C. and draw ratio 4:1. The resulting yarns are then exposed to a 6000 watt Xenon-arc for 300 hours and the average toughness of the yarns, defined as in Example 1, is determined before and after exposure.

Table II

| Stabiliser: | Percent toughness retained after 300 hours exposure to Xenon are |
|---|---|
| 2-hydroxy-4-octyloxybenzophenone | 44 |
| Nickel bis(syn - heptadecyl-2-hydroxy-4-methylphenyl ketoxime) | 76 |
| Nickel bis(syn - heptadecyl-2-hydroxy-4-methylphenyl ketoxime) | 64 |

The yarns containing the nickel complexes are examined in a Mark V Colormaster, the percent reflectance of the yarn being measured and compared with that of white tile under red, blue and green filters. The results, given below in Table III, show the superior colour of the yarn containing nickel bis(syn-heptadecyl 2-hydroxy-4-methylphenyl ketoxime).

Table III

| Stabiliser | Percent reflectance of yarn measured under— | | |
|---|---|---|---|
|  | Red filter | Green filter | Blue filter |
| White tile | 88.70 | 89.21 | 88.14 |
| Nickel bis(syn-heptadecyl-2-hydroxy-4-methylphenyl ketoxime) | 58.20 | 57.38 | 49.69 |
| Nickel bis(syn-methyl-2-hydroxy-4-methylphenyl ketoxime) | 56.07 | 55.14 | 42.67 |

EXAMPLE 3

Polypropylene is blended with 0.5% of stabiliser and 0.25% of 2,6-di-t-butyl-4-methylphenol and compression moulded at 190° C. for 2 minutes to 0.02" thick plaques. The plaques are then exposed to a 1500 watt Xenon-arc lamp. The time in hours necessary for the plaques to absorb 0.06% of oxygen is determined by infra-red spectroscopic measurements on the rate of formation of carbonyl groups as shown by carbonyl absorption bands.

Table IV

| Stabiliser: | Hours |
|---|---|
| Nickel bis(syn-heptadecyl-2-hydroxy-4-methylphenyl ketoxime) | 2320 |
| Nickel bis(syn-methyl-2-hydroxy-4-methylphenyl ketoxime) | 2000 |
| 2-hydroxy-4-octyloxybenzophenone | 650 |

EXAMPLE 4

To 440 parts of chlorobenzene there is added with stirring 133.5 parts of aluminum chloride and 108 parts of m-cresol. 3.03 parts of stearoyl chloride are added dropwise over one hour, and the reaction mixture is refluxed for six hours. After cooling the mixture is poured into 500 parts of ice-water and 236 parts of concentrated aqueous hydrochloric acid. Heating to 90° C. for 15 minutes is followed by separation of the organic layer, which is washed with hot water until acid-free. The chlorobenzene is removed by distillation to leave an oil, which solidifies on cooling to give 2-hydroxy-4-methylphenyl heptadecyl ketone as a yellow solid melting at 68° C.

Replacement of the stearoyl chloride by other acid chlorides gives a variety of hydroxyketones including 2-hydroxy-4-methylphenyl undecyl ketone, and 2-hydroxy-4-methylpenyl hexyl ketone, boling at 124 to 128° C. at a pressure of 0.4 mm. of mercury. Replacement of the m-cresol by o-chlorophenol gives 2-hydroxy-5-chlorophenyl heptadecyl ketone.

225 parts of 2-hydroxy-4-methyl phenyl heptadecyl ketone, 50 parts of hydroxylamine sulphate and 76 parts of sodium hydroxide are dissolved in a mixture of 1500 parts of water and 570 parts of 86% aqueous ethanol. The solution is refluxed for 2 hours, and then cooled. After acidification with hydrochloric acid the cream solid is collected by filtration, well washed with water and dried to give syn-2-hydroxy - 4 - methylphenyl heptadecyl ketoxime, melting at 68–69° C.

There may similarly be prepared other ketoximes including syn-2-hydroxy-4-methylphenyl undecyl ketoxime, syn-2-hydroxy-4-methlphenyl hexyl ketoxime, and syn-2-hydroxy-5-chlorophenyl heptadecyl ketoxime, melting at 67° C.

155.6 parts of syn-heptadecyl 2-hydroxy-4-methylphenyl ketoxime are dissolved in 1350 parts of ethanol and the solution heated at the boiling point with stirring. There is then added dropwise a solution of 47.4 parts of nickel chloride hexahydrate in 300 parts of ethanol and the reaction mixture is boiled for a further hour. Neutralisation with concentrated ammonium hydroxide solution is followed by hot filtration, hot washing with ethanol, cold washing with water, and drying to give 127 parts of nickel (bis(syn-heptadecyl-2-hydroxy - 4 - methylphenyl ketoxime) as a green solid melting at 110–111° C.

Other similar complexes may be prepared in the same manner, including nickel bis(syn-2-hydroxy-4-methylphenyl undecyl ketoxime), melting at 123° C., nickel-bis-(syn-2-hydroxy-4-methylphenyl hexyl ketoxime), melting at 126° C., and nickel bis-(syn-2-hydroxy-5-chlorophenyl heptadecyl ketoxime), melting at 122° C.

EXAMPLE 5

Polyproplyene is blended with 0.5% of stabiliser as listed below, 0.25% of dilaurylthiodipropionate and 0.1% of 1,1,3-tris(2-methyl-4-hydroxy - 5 - tert.-butylphenyl)-butane and compression moulded at 175° C. into plaques. The plaques are then exposed to a 1500 watt Xenon-arc lamp and the times to embrittlement are given in Table IV below.

Table IV

| Stabiliser: | Hours to embrittlement |
|---|---|
| None | 213 |
| 2-hydroxy-4-octyloxybenzophenone | 612 |
| Nickel bis(syn-undecyl 2-hydroxy-4-methylphenyl ketoxime) | 1331 |
| Nickel bis(syn-heptadecyl 2-hydroxy-4-methylphenyl ketoxime) | 1331 |

EXAMPLE 6

Polypropylene is blended with 0.5% of nickel bis-[syn-(2-hydroxy-4-methyl)phenyl hexyl ketoxime], 0.1% of 1,1,3-tris-(2-methyl-4-hydroxy - 5 - t-butylphenyl)butane, and 0.25% of dilauryl thiodipropionate and compression moulded at 180° C. for 1 minute to give a homogenised sheet of 0.75 mm. thickness. When exposed to a 1000 watt Xenon-arc lamp the polypropylene sheet became brittle after 1293 hours.

We claim:
1. A chelate bis complex of nickel with an aromatic oxime of the formula

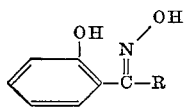

wherein R represents alkyl or monoalkenyl containing from 6 to 18 carbon atoms and the benzene ring is substituted only as shown or also includes methyl or chloro substitution.

2. A chelate complex as claimed in claim 1 wherein R is an alkyl group.

3. A chelate complex as claimed in claim 1 wherein the benzene ring carries a 4-methyl group.

4. A chelate complex as claimed in claim 1 wherein the benzene ring carries a 5-chloro atom.

References Cited
UNITED STATES PATENTS

| | | | |
|---|---|---|---|
| 3,294,842 | 12/1966 | Swanson | 260—566 |
| 3,395,112 | 7/1968 | Kauder | 260—45.75 |

OTHER REFERENCES

Finar Organic Chemistry, vol. 1, Longmans, Green and Co., Ltd., London, 1963, p. 240.

TOBIAS E. LEVOW, Primary Examiner

A. P. DEMERS, Assistant Examiner

US. Cl. X.R.

260—45.75, 429J, 566